(12) United States Patent
Brämer et al.

(10) Patent No.: US 11,359,603 B2
(45) Date of Patent: Jun. 14, 2022

(54) WIND TURBINE WITH MODULAR MAIN SHAFT FASTENING SYSTEM AND ROTOR LOCKING DISC

(71) Applicant: Vestas Wind Systems A/S, Aarhus N. (DK)

(72) Inventors: Daniel Brämer, Aarhus N (DK); Simon Kabus, Viborg (DK); Lasse Køgs Andersen, Hjortshøj (DK); Jeppe Hesseldal Otten, Åbyhøj (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 17/285,229

(22) PCT Filed: Oct. 9, 2019

(86) PCT No.: PCT/DK2019/050299
§ 371 (c)(1),
(2) Date: Apr. 14, 2021

(87) PCT Pub. No.: WO2020/088723
PCT Pub. Date: May 7, 2020

(65) Prior Publication Data
US 2021/0363967 A1 Nov. 25, 2021

(30) Foreign Application Priority Data
Nov. 1, 2018 (DK) .......................... PA 2018 70713

(51) Int. Cl.
*F03D 7/02* (2006.01)
*F03D 80/00* (2016.01)
*F03D 1/06* (2006.01)

(52) U.S. Cl.
CPC ......... *F03D 7/0268* (2013.01); *F03D 1/0691* (2013.01); *F03D 80/00* (2016.05); *F05B 2260/301* (2013.01); *F05B 2260/31* (2020.08)

(58) Field of Classification Search
None
See application file for complete search history.

(56) References Cited

U.S. PATENT DOCUMENTS 8,287,240 B2 * 10/2012 Nitzpon ................. F16D 1/076
290/55
11,156,211 B2 * 10/2021 Rogg ..................... F03D 80/50
(Continued)

FOREIGN PATENT DOCUMENTS

| CN | 205638800 U | 10/2016 |
|---|---|---|
| EP | 2381092 A2 | 10/2011 |
| EP | 3385535 A1 | 10/2018 |
| KR | 20140072561 A | 6/2014 |

(Continued)

OTHER PUBLICATIONS

Danish Patent and Trademark Office, Search and Examination Report in PA 2018 70713, dated Apr. 3, 2019.
(Continued)

*Primary Examiner* — Courtney D Heinle
*Assistant Examiner* — Jason Fountain
(74) *Attorney, Agent, or Firm* — Wood Herron & Evans LLP

(57) ABSTRACT

A wind turbine (10) includes a first connecting structure (36) associated with the main shaft (34) fixed to a second connecting structure (40) of a rotor hub (22). A plurality of blades (24) is coupled to the rotor hub (22). A rotor locking disc (32) is carried on the main shaft (34). The rotor locking disc (32) has a peripheral region and a plurality of rotor locking elements (50) in the peripheral region for receiving one or more rotor locking pins (30). The first connecting structure (36) includes at least first and second sets of
(Continued)

fastener holes (38a, 38b, 38b'). The first set of fastener holes (38a) is located at a position radially inward of the rotor locking elements (50) and the second set of fastener holes (38b, 38b') is located between adjacent rotor locking elements (50). The first and/or second set of fastener holes (38a, 38b, 38b') are used to receive fasteners (39a, 39b) to secure the main shaft (34) to the rotor hub (22).

12 Claims, 4 Drawing Sheets

(56) References Cited

U.S. PATENT DOCUMENTS

| | | | |
|---|---|---|---|
| 2010/0028153 A1* | 2/2010 | Nitzpon | F16D 1/076 |
| | | | 29/889 |
| 2011/0309631 A1 | 12/2011 | Rebsdorf | |
| 2020/0182227 A1* | 6/2020 | Rogg | F03D 80/50 |

FOREIGN PATENT DOCUMENTS

| | | |
|---|---|---|
| WO | 2018065018 A1 | 4/2018 |
| WO | 2018072796 A1 | 4/2018 |
| WO | 2018120081 A1 | 7/2018 |

OTHER PUBLICATIONS

European Patent Office, International Search Rejport and Written Opinion in PCT Application Serial No. PCT/DK2019/050299, dated Dec. 4, 2019.

* cited by examiner

WIND TURBINE WITH MODULAR MAIN SHAFT FASTENING SYSTEM AND ROTOR LOCKING DISC

TECHNICAL FIELD

The present invention relates to wind turbines generally including a tower and one or more nacelles mounted on the tower. The nacelle houses powertrain components, such as a main drive shaft coupled with a rotor. The invention more specifically relates to methods and apparatus for allowing modularity in the connection between the main drive shaft and the rotor hub, as well as an integrated rotor locking system.

BACKGROUND

In wind turbine design, it is necessary to size the connecting structure of the main drive shaft appropriately to the connecting structure of the rotor hub. For example, a relatively small diameter main drive shaft may be appropriately sized relative to a particular rotor hub. If it is desired to attach a different sized main drive shaft to the same rotor hub, an adapter might be used between the main shaft and the rotor hub. This adapter increases complexity and costs and, therefore, is undesirable.

It is also sometimes necessary to lock the rotor of a wind turbine against rotation when the wind turbine is not in use, such as during maintenance or at other downtimes. For this purpose, wind turbines have included rotor braking and locking systems. The braking system is designed to stop the rotor after the rotor has been slowed almost to a stop by the pitch of the blades. The locking system then locks the rotor against any rotation. Locking systems typically utilize locking members, such as pins, that move between locking and unlocking positions in either an axial or a radial direction relative to the direction of rotation of the rotor. The axial direction is parallel to the lengthwise axis of the wind turbine main shaft, while the radial direction is perpendicular to the lengthwise axis of the main shaft. The pin is moved into and out of engagement with a rotatable ring-like structure that is fixed for rotation with both the main shaft and the rotor hub. The present invention relates to those systems using one or more pins moving axially or parallel to the main shaft and the axis of rotation of the rotor rather than moving radially or perpendicular to the main shaft and axis of rotation. The components of the rotor lock systems are usually large cast parts formed in one large piece. The main component is often a cast locking ring having a plurality of closed perimeter recesses that selectively receive rotor locking pins. The recesses may be blind bores or through bores. The locking ring is fixed generally at a location between the main shaft and the rotor hub and rotates with the rotor hub and main shaft when the wind turbine is in operation. When it is desired to lock the rotor hub against rotation, one or more pins are moved into one or more of the respective recesses in the locking ring. The extended pin or pins prevent the locking ring, and therefore both the rotor hub and the main shaft, from rotating. In addition to the rotor locking elements, the locking ring also typically includes fastener holes used to receive bolts for connecting the main shaft to the rotor hub. Design challenges are presented by the inclusion of both rotor locking elements and fastener holes on rotor locking rings.

It would be desirable to provide apparatus and methods for rotor lock systems and for main shaft/rotor hub connections that address the various drawbacks and challenges associated with current technology. Specifically, it would be desirable to provide manners in which the connections made between a main drive shaft and a rotor hub are more modular thereby saving costs in various manners. In addition, it would be desirable to increase efficiency in the use of space on a locking ring for configuring rotor locking elements and fastener holes.

SUMMARY

The present invention generally provides a wind turbine comprising a main shaft, a rotor hub, a plurality of blades coupled to the rotor hub and a rotor locking disc. The main shaft includes a front end, and the front end includes a first connecting structure. The rotor hub includes a second connecting structure. The first connecting structure of the main shaft is fixed to the second connecting structure of the rotor hub. The rotor locking disc is carried on the main shaft and includes a peripheral region and a plurality of rotor locking elements in the peripheral region for receiving one or more rotor locking pins that are configured to move in an axial direction relative to the lengthwise axis of the main shaft. The first connecting structure further comprises at least first and second sets of fastener holes in the peripheral region of the rotor locking disc. The first set of fastener holes is located at a position radially inward of the rotor locking elements and the second set of fastener holes is located between adjacent rotor locking elements. The first and/or second set of fastener holes are used to receive fasteners to secure the main shaft to the rotor hub. In this embodiment, the first and second sets of fastener holes, as well as the corresponding sets of fasteners, may be of the same diameter or of different diameter. In addition, the rotor locking elements may be of any desired configuration or design, such as recesses of any suitable shape.

The invention may alternatively or additionally include further features and/or components. For example, a third set of fastener holes may be located in the peripheral region of the rotor locking disc radially outwards of the second set of fastener holes. In this embodiment, both the second and third sets of fastener holes are located between adjacent rotor locking elements. At least one set of the two or three sets of fastener holes may be of different diameter than another set of the fastener holes. The set or sets of fastener holes located between the rotor locking elements may be of a smaller diameter than the first set of fastener holes located at a radially inward position relative to the rotor locking elements. The rotor locking elements may further comprise open perimeter recesses in which the perimeters of the recesses open to an outer circumference of the rotor locking disc. Alternatively, these rotor locking elements may be comprised of complete or continuous closed perimeter throughholes as in conventional technology. The rotor locking disc may be integrated with the main shaft, or may be comprised of at least one component separate from the main shaft proximate or near the front end of the main shaft and affixed to the main shaft with a plurality of fasteners. Each of the plurality of recesses may be generally U-shaped.

The present invention further provides a wind turbine comprising a main shaft, a rotor hub, and a plurality of blades coupled to the rotor hub. The main shaft includes a front end and the front end has a first connecting structure. The rotor hub includes a second connecting structure. The first connecting structure of the main shaft is fixed to the second connecting structure of the rotor hub to allow these two components to rotate together. The first connecting structure comprises at least first and second sets of fastener holes. The first set of fastener holes comprises holes of a larger diameter than the fastener holes of the second set.

Additional aspects may include a third set of fastener holes radially outwards of the second set of fastener holes, wherein both the second and third sets of fastener holes are comprised of holes having smaller diameters than the fastener holes of the first set. The first and second sets of fastener holes may be located on a flange integrated onto the front end of the main shaft. A rotor locking disc may be carried on the main shaft, wherein the first and second sets of fastener holes are located on the rotor locking disc. The rotor locking disc may be either integrated onto the main shaft or affixed as a separate component on the main shaft.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION

Figure 1:
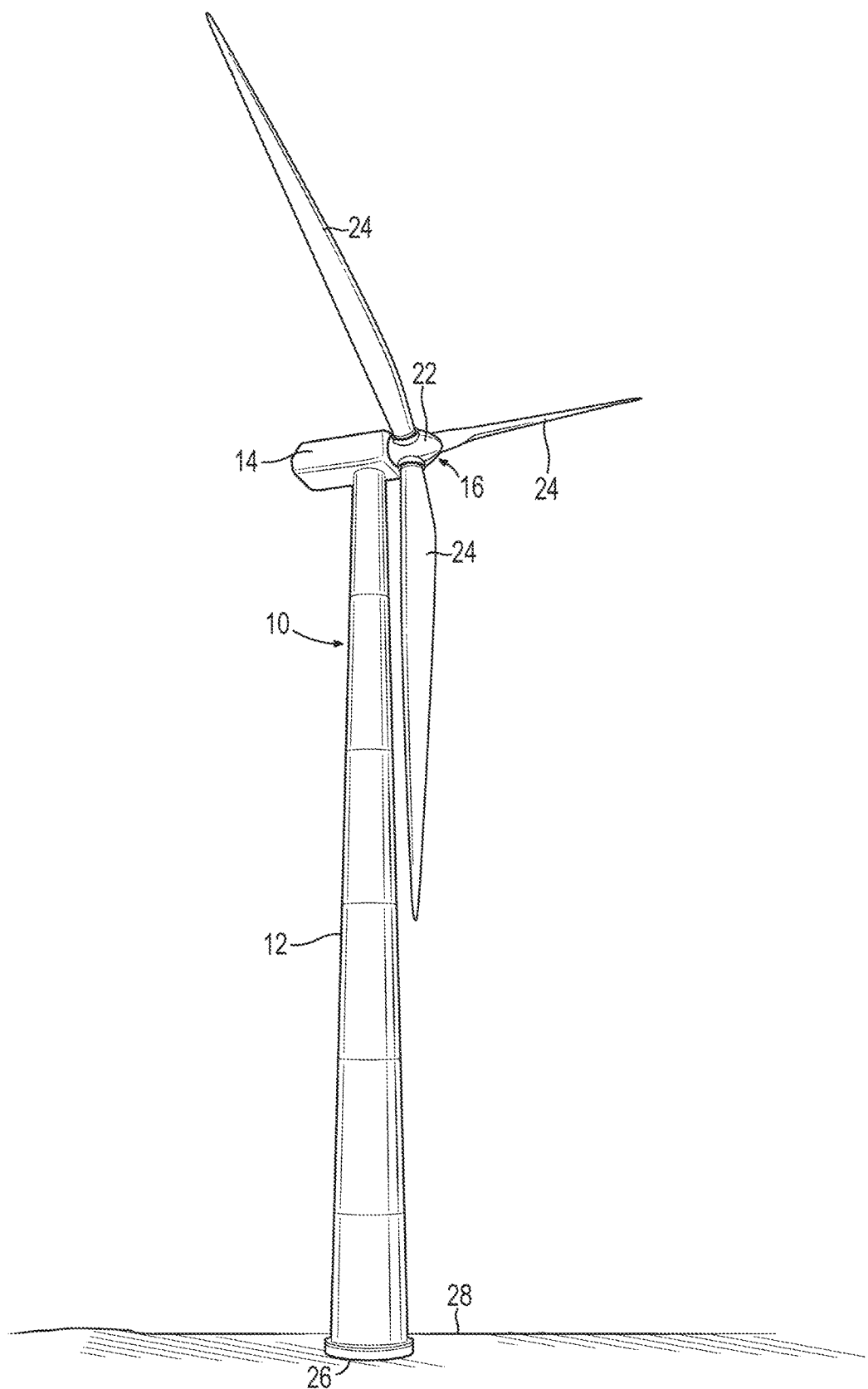
FIG. 1 is a perspective view of a wind turbine constructed in accordance with an illustrative embodiment of the invention.

Referring first to FIG. 1, a wind turbine 10 is shown and is constructed with a tower 12, a nacelle 14, and a rotor 16 coupled for rotation relative to the nacelle 14. The rotor 16 generally comprises a rotor hub 22 and three turbine blades 24 fixed for rotation with the rotor hub 22. As shown, the tower 12 includes a base 26 fixed to a support surface 28 which may, for example, be a foundation in the ground or any other suitable support surface including a platform at sea.

Figure 2:
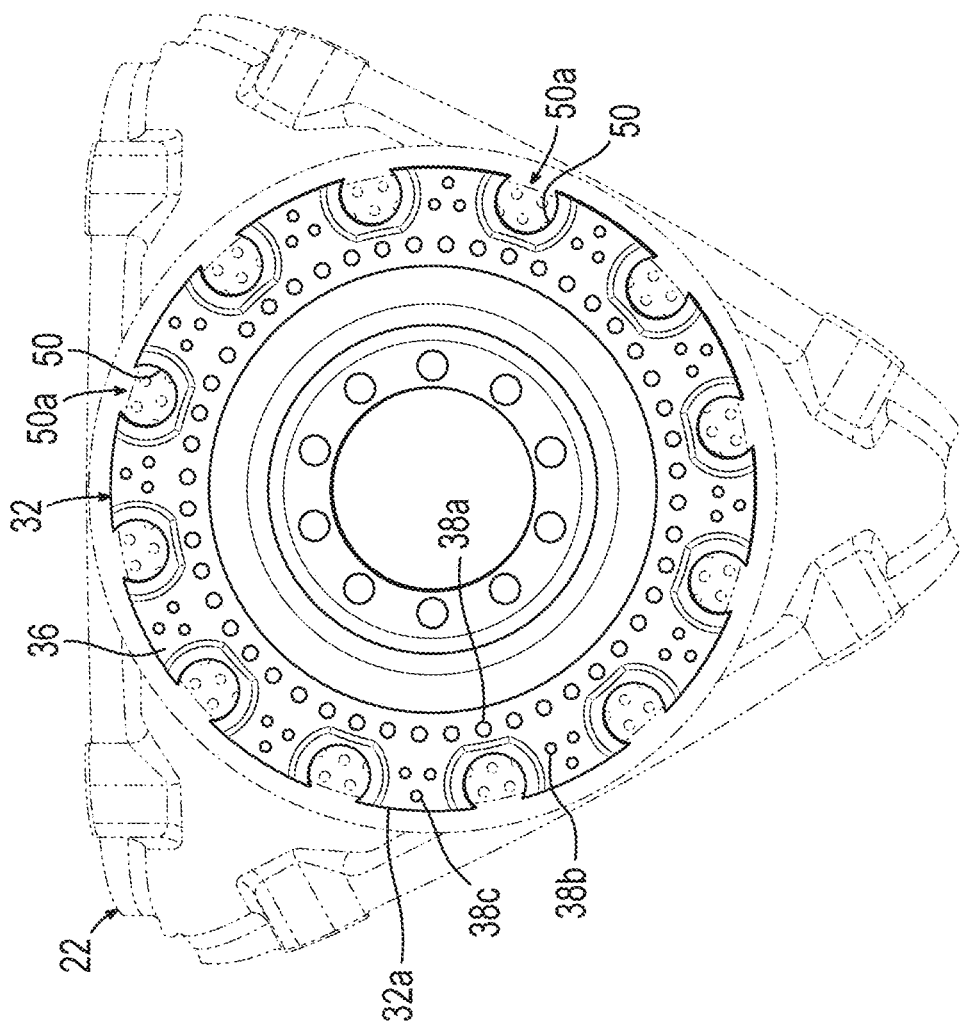
FIG. 2 is an elevation view illustrating the rotor locking disc, main shaft and rotor hub.
Figure 3:
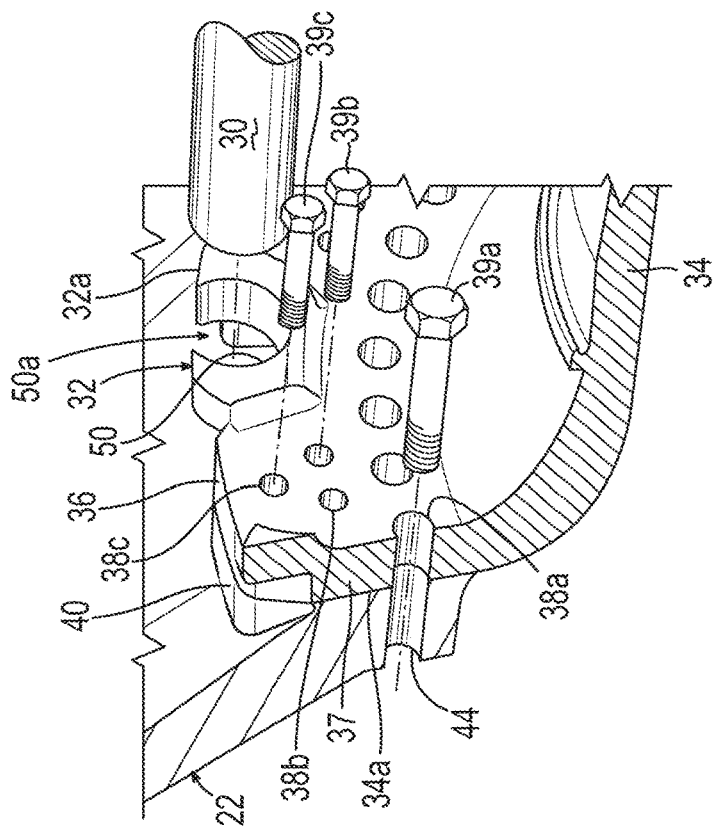
FIG. 3 is an enlarged perspective view cross sectioned to illustrate the connecting structure between the main shaft and the rotor hub under one modular connection scenario.

Referring now to FIGS. 1-3, a first illustrative embodiment is shown. At times the rotor 16 must be fixed against any rotation. For example, these time periods may include maintenance periods or other times during which the wind turbine 10 is not in use. For this purpose, the wind turbine 10 includes a braking system and control (not shown) which will be used to slow and then stop the rotor 16 from rotating. The control will be used to activate a rotor lock system that comprises a plurality of rotor locking pins 30 engageable and disengageable with a rotor locking disc 32 as further described below.

The wind turbine 10 generally includes a main shaft 34 which is coupled to a generator directly or through other drive components (not shown). The main shaft 34 further includes a front end 34a. The front end 34a includes a first connecting structure 36. The rotor hub 22 includes a second connecting structure 40 configured to mate with the first connecting structure 36 on the front end 34a of the main shaft 34. These connecting structures 36, 40 are fixed rigidly together using one or more sets of threaded bolts 39a, 39b, 39c extending through respective holes 38a, 38b, 38c of the flange 37 and into large holes 44 and/or smaller holes (not shown) provided in the rotor hub 22 as will be described further below. As shown, the rotor locking disc 32 is carried on the main shaft 34 proximate the front end 34a. This may be accomplished in several different manners. For example, the disc 32 may be comprised of one or more separate components sandwiched or located between or adjacent the flange 37 and the connecting structure 40 of the rotor hub 22 and thereby rigidly affixed between these two components using the same bolts 39a, 39b, 39c as used to connect the flange 37 to the rotor hub 22. Alternatively, the rotor locking disc 32 may be integrated onto an area proximate the front end 34a of the main shaft 34, such as by casting or otherwise forming the rotor locking disc 32 with the main shaft 34. One advantage of having the rotor locking disc 32 comprised of at least one separate component is that if the rotor locking system somehow damages the disc 32, the disc may be replaced and/or repaired without having to remove and replace the entire main shaft 34.

Figure 4:
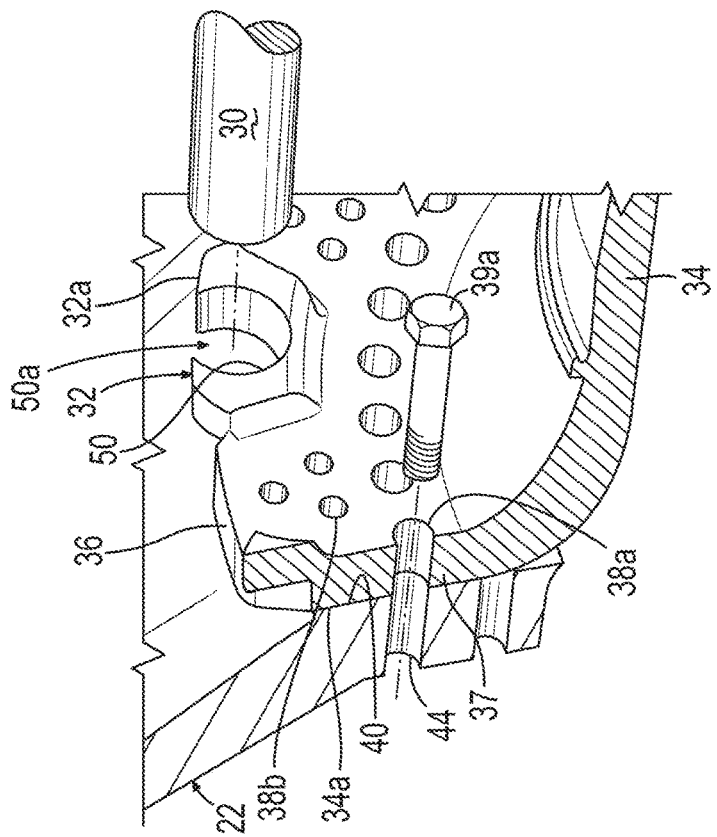
FIG. 4 is an enlarged perspective view cross sectioned to illustrate the connection between the main shaft and rotor hub under another modular connection scenario.

As further shown in FIGS. 2-4, the rotor locking disc 32 has an outer generally circular circumference 32a and a plurality of rotor locking elements in the form of recesses 50 having openings 50a on their perimeters that communicate with the outer circumference 32a. In other embodiments, the rotor locking elements 50 may comprise any other configurations, such as conventional circular or other continuous or closed perimeter recesses. The recesses may be complete through bores or blind bores. At least one rotor locking pin 30 is movable in an axial direction parallel to the lengthwise axis of the main shaft 34. The pin 30 moves between a disengaged position relative to at least one of the recesses 50 and an engaged position at least partially located in one of the recesses 50 for locking the rotor hub 22 against rotation. The recesses 50 are shown as partially circular in shape and the pins 30 have a complementary cylindrical shape for closely extending at least partially into an aligned recess 50. Other shapes may be used instead. Two rotor locking pins 30, for example, may be located at the three o'clock and nine o'clock positions relative to the disc 32 and may be driven along their respective axes by suitable drive components (not shown) between extended and retracted positions. In the extended position, the pins 30 will have their ends at least partially received in a respective aligned recess 50 thereby locking the rotor hub 22 and main shaft 34 against any rotation. For achieving this purpose, it will be appreciated that the pins 30 are part of a rotor locking system in the nacelle 14 (FIG. 1) that is rigidly secured and fixed in place with components that are not shown for the sake of conciseness. However, these components of the rotor locking system are well known to those of skill in the art. In the retracted or disengaged position, the pins 30 will move along the same axial path as the engagement movement previously described but in the opposite direction. This disengagement will unlock disengage the recesses 50 and allow rotation of the rotor hub 22 and main shaft 34.

The outer diameter of the rotor locking disc 32 is smaller than the outer diameter of a conventional rotor locking ring having closed perimeter recesses near the periphery for receiving rotor locking pins. However, embodiments having closed perimeter recesses also have advantages and will be described further below in connection with FIG. 5. The reduction in diameter allowed by the use of open perimeter recesses 50 further increases accessibility to the rotor hub 22 and reduces weight of the rotor locking disc 32 while enabling optimization of strength and stress characteristics, as well as allowing more design freedom for the shape and configuration of the disc 32.

Referring further to FIGS. 2-4, the connection between the main drive shaft 34 and the rotor hub 22 is shown. As illustrated best in FIGS. 3 and 4, the main shaft 34 includes a front end 34a including a flange 37 having a first connecting structure 36. The rotor hub 22 includes a second connecting structure 40. The first connecting structure 36 of the main shaft 34 is fixed to the second connecting structure 40 of the rotor hub 22. More specifically, the first connecting structure 36 comprises at least first and second sets of fastener holes 38a, 38b in the peripheral region of the rotor locking disc 32. The rotor locking disc 32, in this embodiment, comprises an integral flange 37. However, it will be appreciated that the rotor locking disc 32 may instead be a separate component affixed to the main shaft 34. The rotor locking disc 32 is carried proximate the front end 34a of the main shaft 34. In this embodiment, the rotor locking elements are respective recesses 50, as mentioned above, but these may be formed in any other configurations such as when combined with the sets of different sized fastener holes 38a, 38b and/or 38c. The first set of fastener holes 38a is located at a position radially inward of the rotor locking elements 50 and the second set of fastener holes 38b is located between adjacent rotor locking elements 50.

As indicated by a comparison of FIGS. 3 and 4, the first and/or second sets of fastener holes 38a, 38b are used to receive fasteners 39a and/or 39b to secure the main shaft 34 to the rotor hub 22. A third set of fastener holes 38c are located in the peripheral region of the rotor locking disc 32 in this embodiment as well. Both the second and third sets of fastener holes 38b, 38c are located between adjacent rotor locking elements 50. When making certain connections between a main shaft 34 and a rotor hub 22, it may be desirable to use all three sets of fastener holes 38a, 38b, 38c and corresponding bolts 39a, 39b, 39c for securing the main shaft 34 to the rotor hub 22. In other situations, it may be necessary to only use the first set of fastener holes 38a and corresponding large bolts 39a for securing the main shaft 34 to the rotor hub 22. In this embodiment, the first set of fastener holes 38a comprise holes of larger diameter than the second and third sets of fastener holes 38b, 38c. For example, the first set of fastener holes 38a are relatively larger sized to receive M48 bolts, while the second and third sets of fastener holes 38b, 38c are relatively smaller sized to receive M36 bolts. Using a main shaft 34 configured with these three sets of circularly arranged holes 38a, 38b, 38c, the same main shaft may be affixed to a first hub 22 using only the larger holes 38a and larger bolts 39a, or to another hub 22 having a different size and/or design configuration using all three sets of holes 38a, 38b, 38c and both large bolts 39a and smaller bolts 39b, 39c. Further, as the third set of fastener holes 38c are positioned radially outwards of the second set of fastener holes 38b, further combinations of the use of holes are possible dependent on which configuration is desired. Examples of possible combinations are 1) only holes 38a as mentioned above, 2) holes 38a and 38b for slightly larger hubs, 3) holes 38b and 38c for even larger hubs, and 4) all holes 38a, 38b and 38c for heavy hubs. As further described in the embodiment illustrated in FIG. 5, below, in various aspects the invention may include multiple sets of holes in which all holes have the same diameter.

Figure 5:
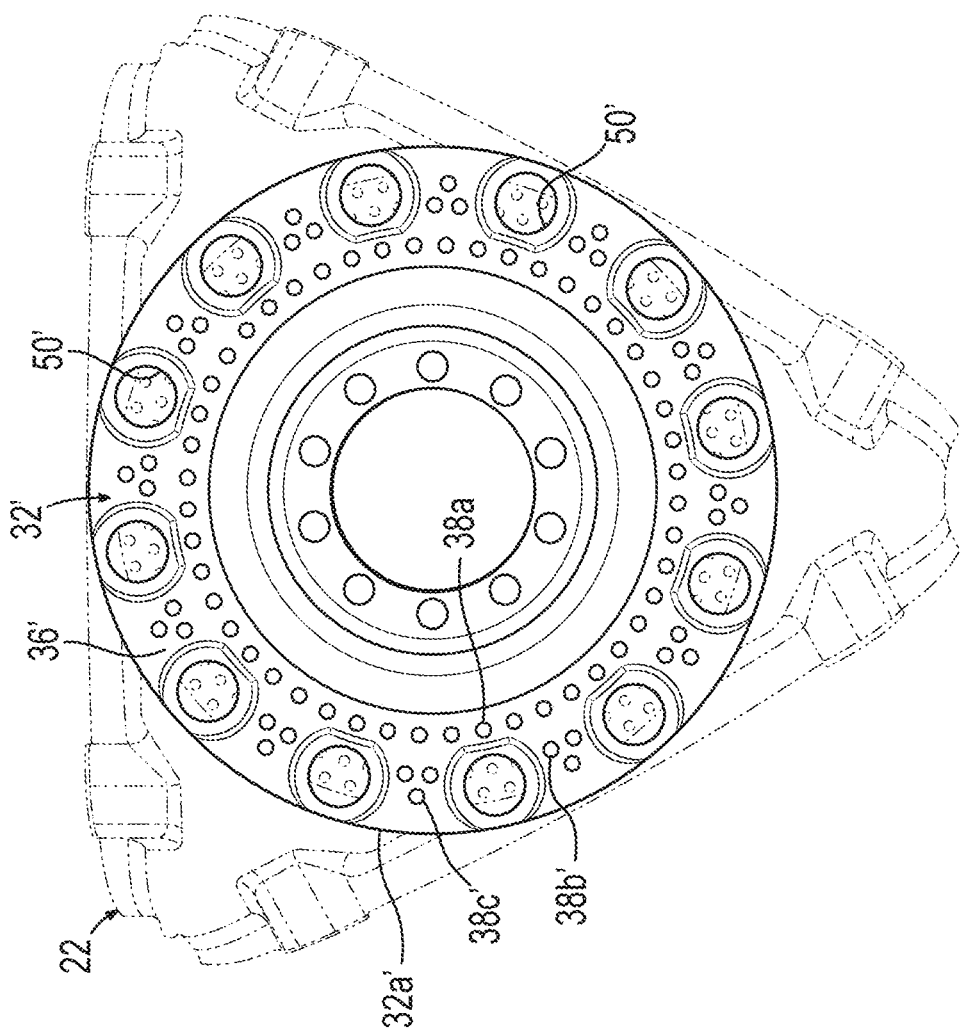
FIG. 5 is an elevation view similar to FIG. 2 but illustrating an alternative embodiment including recesses of closed perimeter shape and sets of fastener holes having equal diameters.

A second illustrative embodiment of the invention is shown in FIG. 5. This embodiment may be formed as described generally above in connection with the first embodiment, but may further include differences as shown and/or described with respect to FIG. 5. In this figure, the same reference numerals are used to describe common features or components with respect to the first embodiment and need no further detailed discussion. Features or components that are slightly different from analogous features or components of the first embodiment are denoted with the same reference numerals but also include prime (') marks. More specifically, the first connecting structure 36' comprises at least first and second sets of fastener holes 38a', 38b' in the peripheral region of the rotor locking disc 32. The rotor locking disc 32, in this second embodiment, comprises an integral flange 37. However, it will be appreciated that the rotor locking disc 32 may instead be a separate component affixed to the main shaft 34. The rotor locking disc 32 is carried proximate the front end 34a of the main shaft 34. In this embodiment, the rotor locking elements are illustrated as respective closed perimeter recesses 50, but these may be formed in any other configuration(s) as described herein or otherwise. The first set of fastener holes 38a is located at a position radially inward of the rotor locking elements 50 and the second and third sets of fastener holes 38b', 38c' are located in the spaces of the locking disc 32 between adjacent rotor locking elements 50. As with the first embodiment, there may be only holes 38b' or 38c' located between adjacent rotor locking elements 50, or both sets may be located between adjacent rotor locking elements 50. In addition, there may be additional holes (not shown) located radially outward of the rotor locking elements 50. Notably, in this embodiment, fastener holes 38a, 38b', and 38c' each have the same diameter. The diameters may be of any desired or necessary size for the application. While there are advantages of using sets of fastener holes having different diameters as previously described herein, there are independent advantages of locating fastener holes between adjacent rotor locking elements 50. In this regard, the space between adjacent rotor locking elements 50 is efficiently used for connection purposes by placement of one or more fastener holes in these spaces, regardless of the size of the fastener holes and regardless of the particular design or configuration of the rotor locking elements.

As in the first embodiment, the first and/or second sets of fastener holes 38a, 38b' are used to receive suitable fasteners such as bolts to secure the main shaft 34 to the rotor hub 22. A third set of fastener holes 38c' are located in the peripheral region of the rotor locking disc 32 in this embodiment as well. Both the second and third sets of fastener holes 38b', 38c' are located in the material of the disc 32 between adjacent rotor locking elements 50. When making certain connections between a main shaft 34 and a rotor hub 22, it may be desirable to use all three sets of fastener holes 38a, 38b', 38c'. As one of many examples, bolts 39a as described in the first embodiment may be used for securing the main shaft 34 to the rotor hub 22. In other situations, it may be necessary to use only the first set of fastener holes 38a and corresponding bolts 39a for securing the main shaft 34 to the rotor hub 22. If all holes 38a, 38b', 38c' have the same corresponding diameter, then bolts 39a may be used as necessary in each of the holes 38a, 38b', 38c'.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in any combination depending on the needs and preferences of the user.

The invention claimed is:

1. A wind turbine, comprising:
a main shaft including a front end, the front end including a first connecting structure;
a rotor hub including a second connecting structure, wherein the first connecting structure of the main shaft is fixed to the second connecting structure of the rotor hub;
a plurality of blades coupled to the rotor hub;
a rotor locking disc carried on the main shaft, the rotor locking disc having a peripheral region and a plurality of rotor locking elements in the peripheral region for receiving one or more rotor locking pins that are configured to move in an axial direction relative to the lengthwise axis of the main shaft; and
at least first and second sets of fastener holes in the peripheral region of the rotor locking disc, the first set of fastener holes located at a position radially inward of the rotor locking elements and the second set of fastener holes located circumferentially between and within a radial extent of adjacent rotor locking elements, wherein the first and/or second set of fastener holes are used to receive fasteners to secure the main shaft to the rotor hub.

2. The wind turbine of claim 1, further comprising:
a third set of fastener holes in the peripheral region of the rotor locking disc positioned radially outwards of said second set of fastener holes, wherein both the second and third sets of fastener holes are located between adjacent rotor locking elements.

3. The wind turbine of claim 1, wherein at least one set of the fastener holes are of a different diameter than another set of the fastener holes.

4. The wind turbine of claim 3, wherein the set or sets of fastener holes located between the rotor locking elements are of a smaller diameter than the first set of fastener holes.

5. The wind turbine of claim 1, wherein the fastener holes of each set are of the same diameter.

6. The wind turbine of claim 1, wherein the rotor locking elements further comprise recesses having perimeters opening to an outer circumference of the rotor locking disc.

7. The wind turbine of claim 1, wherein the rotor locking elements further comprise recesses each defined by a closed perimeter.

8. The wind turbine of claim 1, wherein the rotor locking disc is integrated with the main shaft.

9. The wind turbine of any of claim 1, wherein the rotor locking disc is a separate component from the main shaft and affixed to the main shaft with a plurality of fasteners.

10. A wind turbine, comprising:
a main shaft including a front end, the front end having a first connecting structure;
a rotor hub including a second connecting structure, wherein the first connecting structure of the main shaft is fixed to the second connecting structure of the rotor hub,
wherein the first connecting structure comprises at least first and second sets of fastener holes, and the first set of fastener holes comprises holes of a larger diameter than the fastener holes of the second set; and
a rotor locking disc carried on the main shaft,
wherein the first and second sets of fastener holes are located on the rotor locking disc, and the rotor locking disc is unitary with the main shaft.

11. The wind turbine of claim 10, further comprising:
a third set of fastener holes positioned radially outwards of said second set of fastener holes, wherein both the second and third sets of fastener holes are comprised of holes having smaller diameters than the fastener holes of the first set.

12. The wind turbine of claim 10, wherein the first and second sets of fastener holes are located on a flange integrated with the main shaft.

* * * * *